United States Patent

[11] 3,600,563

| [72] | Inventors | Lawrence C. Porter<br>Palos Verdes Peninsula;<br>Kenneth E. Graves, Saratoga, both of,<br>Calif. |
|---|---|---|
| [21] | Appl. No. | 733,533 |
| [22] | Filed | May 31, 1968 |
| [45] | Patented | Aug. 17, 1971 |
| [73] | Assignee | The Upjohn Company<br>Kalamazoo, Mich. |

[54] METHOD AND APPARATUS FOR DETERMINING THE TRUE DIFFERENCE OR ERROR BETWEEN TWO FREQUENCIES
31 Claims, 4 Drawing Figs.

[52] U.S. Cl.................................................... 235/150.3,
235/150.52, 235/151.34, 235/92 FL
[51] Int. Cl..................................................... G06g 7/57
[50] Field of Search............................................235/151.12,
151.34, 150.31, 150.52, 150.51, 92, 150.3;
328/129, 133; 307/269, 271

[56] References Cited
UNITED STATES PATENTS

| 3,219,046 | 11/1965 | Waugh | 235/151.34 X |
| 3,229,077 | 1/1966 | Gross | 235/92 (30) UX |
| 3,274,583 | 9/1966 | Boyd, Jr. | 235/92 (29Fl) UX |
| 3,305,786 | 2/1967 | Smith | 328/129 |
| 3,438,385 | 4/1969 | Nogami | 235/151.34 X |
| 3,342,199 | 9/1967 | McEvoy | 235/151.12 X |
| 3,474,815 | 10/1969 | Beahm et al. | 235/151.34 X |

Primary Examiner—Malcolm A. Morrison
Assistant Examiner—Joseph F. Ruggiero
Attorneys—Edmund F. Bard and Donald H. Fidler ABSTRACT: Methods and apparatus are disclosed for time base correction of error computations derived from comparisons of samples of two frequencies. If an incoming frequency is sampled during a time interval different from the time base of the sampled frequency, and if the frequency sample is compared with a preselected frequency, the difference will be an "apparent" error represented by one or more pulses. This invention provides methods and apparatus for deriving "true error" as the product of "apparent error" and a factor functionally related to the ratio of the time base of sampled frequency to the sampling time interval.

LAWRENCE C. PORTER &
KENNETH E. GRAVES
INVENTORS

BY Arnold, Roylance,
Kruger & Durkee
ATTORNEYS

FIG. 4

METHOD AND APPARATUS FOR DETERMINING THE TRUE DIFFERENCE OR ERROR BETWEEN TWO FREQUENCIES

BACKGROUND OF INVENTION

This invention relates to methods and apparatus for deriving the product of an input frequency, and more particularly relates to methods and apparatus for determining the true difference or error between two frequencies. The invention specifically includes methods and apparatus useful for deriving correction signals for controlling a material blending system.

One-shot chemical blending operations, such as that described in the copending U.S. Pat. application Ser. No. 701,596, filed Jan. 30, 1968, are well known. In such a system, a digital measurement signal is continually derived with respect to each incoming material, and each of these measurement signals may be periodically compared with reference signals representing functions of the components of a predetermined formulation. Any differences which arise as a result of such comparison may function as the basis for corrections of the proportions or other parameters of the operation, whereby the formulation may be maintained.

In a system such as that described in the aforementioned U.S. Pat. application Ser. No. 701,596, the operation is extremely sensitive to minute deviations in the transfer rate of certain catalytic components, and thus it is often essential to derive error corrections within three or more significant figures. Accordingly, it is extremely desirable to employ digital measurement and control techniques, since digital techniques are inherently more precise than are analog techniques.

There is an inherent disadvantage in the use of digital techniques for material blending operations and the like, however, where the measurement or other signals to be sampled are pulse trains or the like, and when the time base of the sample period is different from the time base of the frequency of the signals to be sampled. Referring to the aforementioned U.S. Pat. application Ser. No. 701,596, for example, it may be seen that the subject blending system involves the continuous commingling of 12 different liquids, and that corresponding measurement signals are derived to provide separate continuous indications of the actual mass transfer rate of each of these liquids into the process. Furthermore, it may be seen that at least two or more of these frequencies represent mass transfer rates in terms of pounds (or fractions of pounds) of material per minute, whereas the sample period is a function of the master or base reference frequency and may be one-tenth second.

In a blending system of the type hereinbefore mentioned it is often desirable to select one of the constituents of the process (usually resin) and then to derive the ratio of the throughput rate of each of the other components with respect to the resin throughput rate. As hereinbefore stated, however, it is desirable to derive the various throughput rates in digital form, and in the subject blending systems this is done by deriving selected pulse trains at frequencies representative of the mass transfer or throughput rate of each constituent.

For example, a suitable resin transfer rate may be 100 pounds per minute and may be indicated by a measurement signal having a frequency of 10,000 pulses per second. On the other hand, a suitable amine transfer or throughput rate may be 1 pound per minute, and this may be indicated by a measurement signal having a frequency of 10,000 pulses per second. In this instance, each resin pulse per second represents a transfer rate of 1/100 pound per minute, whereas each amine pulse per second represents a transfer rate of 1/10,000 pound per minute.

As hereinbefore stated, it is desired to periodically derive the ratio of the transfer rate of each constituent with respect to the transfer rate of a selected one of the constituents. Since the measurements are provided in terms of pulse trains or frequencies for each component, this may be achieved by simply counting the pulses occurring in each pulse train during a preselected sample period (such as one-tenth of a second), and then deriving the ratio of the two pulse counts. This is undesirable, however, since it requires expensive computer circuitry, and since this is obviously a two-step technique usually requiring a substantial amount of time to perform.

Accordingly, if instead of counting pulses which arrive during a preselected time interval, the time interval is first measured during which a preselected number of resin pulses arrives at the counter, the number of pulses in each of the other pulse trains arriving during the same measured time interval will then automatically constitute the ratio of the pulses in each pulse train with respect to the resin frequency. The preselected resin pulse number may be any number such as 10, 100, 1,000, etc., but it is usually one thousand since this will provide ratio measurements accurate to four significant figures.

The purpose of periodically sampling the ratios as hereinbefore described, is to obtain a measurement of the actual throughput rate ratio for comparison with a preselected or "preset" ratio for each constituent, whereby any difference therebetween may be measured to develop a suitable correction factor. As will hereinafter be apparent, any difference between an actual ratio and its corresponding preset ratio will appear as one or more pulses the number of which will be functionally representative of the magnitude of the error. This is because such a system operates in terms of mass transfer rates (i.e., pounds per minute, etc.), and thus any error will be functionally related to the difference between the number of units desired to be transferred during the sample period and the number of actual units so transferred during this period.

However, the error measurement provided or derived in this manner is only the "apparent error," and is only a function of the "true error" in mass transfer rate, since the sample period may be different from the time base of the frequency sought to be sampled. Thus, the number of pulses which make up the "apparent error" will constitute only a corresponding proportion or fraction of the number of pulses which would have been generated had the sample period equalled the time base of the measurement signal. Accordingly, it is necessary to multiply the number of pulses constituting the "apparent error" by a factor corresponding to the reciprocal of this fraction, if the "true error" is to be determined in one step from a single sample.

For example, let it be assumed that 1,000 resin rate pulses arrive during a sampling period of 0.5 seconds duration, and that when the amine signal is sampled for the same time period, 13 amine pulses are accumulated. If the preset ratio of the amine-to-resin signals is 1:100, the difference of the actual amine-to-resin ratio and the preset amine-to-resin ratio is three amine pulses for 1000 resin pulses and this may be termed the "apparent error."

As hereinbefore stated, it is desired to derive a correction signal from the determined error for the purpose of adjusting the amine signal. It will be apparent that any correction signal derived from the 3 pulse error count will be insufficient, however, since the time base of the sample period is only one-half of the time base of the throughput rate sought to be corrected. In other words, if the time base of the sample period had been equal to the time base of the incoming pulse trains, the sample period would have been 1 full second, and twice as many error pulses would have been counted during this period.

As may be seen by the foregoing, the "true error" is 6 pulses, and this can be derived by multiplying the "apparent error" by a factor of two. Thus, the correction signal must be derived from the product of the "apparent error" and a factor corresponding to the ratio of the measurement signal time base to the sample period. Alternately, the multiplying factor may be seen to be the ratio of the resin measurement frequency (in terms of cycles or pulses per second) to the preselected number of resin pulses (1,000) which is used to establish the sample period.

The significance of deriving "true error" instead of merely "apparent error," will be apparent if it is understood that correction or control signals may be derived from these error signals to correct or adjust the throughput rates of the constituents of the process. If the sample period is only a fraction of the time base of the sampled frequency, it will be apparent that a correction signal derived from "apparent error" will only adjust a corresponding fraction of the "true error." Thus, several sequences of samplings and resulting adjustments will otherwise be necessary to bring the actual transfer rate into practical conformity with the preset transfer rate sought to be attained. More important, the amount of the error may actually fluctuate faster than it can be measured and corrected, and thus system control may be effectively lost for all substantial purposes.

SUMMARY OF INVENTION

As hereinbefore stated, the advantages of the present invention are preferably attained wherein methods and apparatus are provided for deriving true error or difference between two input frequencies as the product of the "apparent" difference and the reciprocal of the ratio of the sample time base to the time base of the sampled signal. It will be noted, however, that the time base of the sampled signal is a direct function of the frequency of such signal. Accordingly, it is a preferred embodiment of the present invention to derive the true error as the product of the "apparent" difference or error and the reciprocal of the ratio of the number of pulses occurring in the sampled signal during the sampling interval.

DRAWINGS

These and other features and advantages of the present invention will be apparent from the following description, wherein reference is made to the figures of the accompanying drawings.

In the Drawings.

DETAILED DESCRIPTION

Figure 1:
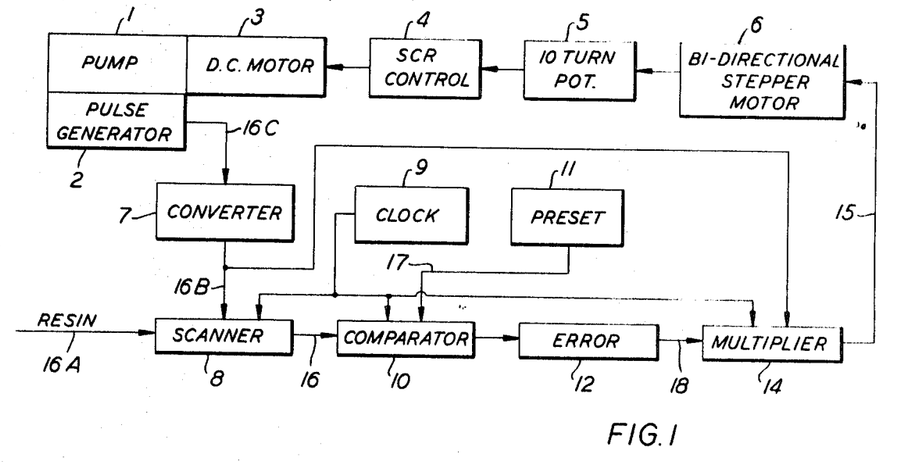
FIG. 1 is a functional representation of an exemplary fluid transfer and control system, including a general representation of means included in such system for adjusting the control signal output of such system.

Referring now to FIG. 1, there may be seen a functional representation of a fluid pumping system incorporating an embodiment of the present invention. As illustrated, a pump 1 is driven by a suitable DC motor 3 to deliver a particular constituent such as amine into a blending system (not depicted), and is also interconnected with a suitable pulse generator 2 which is preferably arranged to deliver a train of pulses 16C at a frequency functionally representative of the rotation of the shaft of either the pump 1 or the motor 3. As will be apparent to those with experience in this art, it may be convenient to convert this pulse train 16C into a secondary pulse train 16B which is more directly related to the actual mass transfer rate of the pump 1, and therefore more convenient for the purpose suggested by FIG. 1. Accordingly, a suitable frequency-to-frequency converter 7 may be included to generate a different frequency 16B for application to a scanner circuit 8 such as that depicted in the aforementioned U.S. Pat. application Ser. No. 701,596.

In the system illustrated in FIG. 1, a suitable clock 9 may also be provided for generating actuating pulses to the scanner circuit 8, a suitable comparator circuit 10, and to a suitable multiplier circuit 14 which is also connected to receive the output frequency from the converter 7. A suitable preset circuit 11 is also preferably included to provide a signal functionally related to the mass transfer rate sought to be attained, and this preset signal 17 is also applied to the comparator circuit 10.

The scanner circuit 8 is adapted to select a representative portion of the pulse output 16B of the converter circuit 7, and to derive an output frequency 16 which is the ratio of the actual mass transfer rate of a base or master input frequency 16A (such as resin as indicated in the said application Ser. No. 701,596), with respect to the mass transfer rate of the constituent being transferred by the pump 1. This output signal 16 is compared by the comparator circuit 10 with an output signal 17 from the preset circuit 11, which signal 17 is functionally representative of the aforementioned ratio sought to be achieved, and any difference therebetween is accumulated in an error counter 12 as a functionally related number of ratio error pulses.

As hereinbefore explained, the sampling period is a fraction of the time base of the signal 16 delivered from the scanner circuit 8, and thus the number of ratio error pulses accumulated by the error counter 12 is only the "apparent error" and must be multiplied by the reciprocal of the ratio between the sampling period and the time base of the output signal 16 from the scanner circuit 8. It will be recalled, however, that the sampling period is whatever time interval is required for a preselected number of resin input frequency pulses to occur, and since the actual resin throughput rate may deviate from the resin rate component of the preselected ratio represented by signal 17, the sampling period may vary from sample to sample. Accordingly, the factor being applied by the multiplier circuit 14 may be subject to variance, as will hereinafter be explained.

In general, however, it may be stated for present purposes that the multiplier circuit 14 counts the pulses in signal 18 representing the "apparent error," and in response thereto, generates a correction signal 15 which is the product of the number of the error pulses and the reciprocal of the ratio of the sample period to the time base of the scanner output signal 16. This correction signal 15 is the "true error," and may be applied as a train of stepping pulses to a suitable bidirectional stepper motor 6. A suitable 10-turn potentiometer 5, or the like, may be arranged to vary the output of a suitable silicon control rectifier 4, or the like, in accordance with the adjustment provided by the stepper motor 6, and the rectifier 4 in turn adjusts the speed of the DC motor 3 accordingly.

Figure 2:
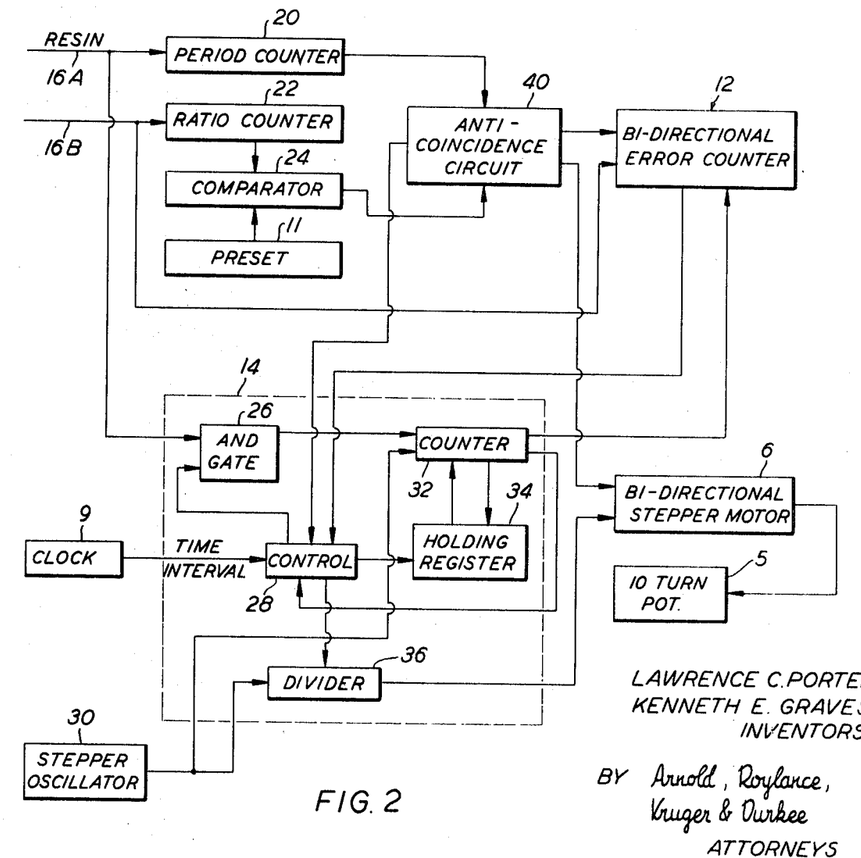
FIG. 2 is a functional representation of a selected portion of the system depicted in FIG. 1 exemplifying the present invention.

Referring now to FIG. 2, there may be seen a more detailed representation of a portion of the system depicted in FIG. 1, wherein the scanner output signal 16 illustrated in FIG. 1 is shown to be composed of pulses in the resin transfer rate measurement signal 16A, and pulses in the mass transfer rate signal 16B provided by the converter 7. The period counter 20 is preadjusted to accumulate a preselected number of resin pulses (such as 1,000), and then to generate an output signal which is applied to a conventional anticoincidence circuit circuit 40 when the 1,000 resin pulses have occurred. This provides the sample time period hereinbefore discussed.

The pulses 16B are applied simultaneously to a ratio counter 22 and to a bidirectional error counter 12 during the sample period. The ratio counter 22, in turn, applies a signal representative of the magnitude of the pulses being accumulated in the ratio counter 22. A comparator circuit 24 receives this signal and compares it with the output of the preset circuit 11 representing the ratio sought to be obtained. When the signal from the ratio counter 22 agrees with output from the preset circuit 11, a pulse will be generated and applied to an anticoincidence circuit 40. If the pulse from the comparator circuit 24 reaches the anticoincidence circuit 40 simultaneously with the time pulse from the period counter 20, it will be apparent that the pump 1 is delivering amine at the proper mass transfer rate, and no output signal will appear from the anticoincidence circuit 40 because there is no error to correct.

On the other hand, if the actual amine frequency represented by the output signal from the ratio counter 22 is either higher or lower than the amine frequency component of the output from the preset circuit 11, the pulse from the comparator 24 will arrive at the anticoincidence circuit 40, either ahead of or behind the time pulse from the period counter 20, and the interval between the arrivals will be functionally related to the error in amine transfer rate. This error is characterized by an output pulse from the anticoincidence circuit 40, and is a gating pulse which is applied to the bidirectional error counter 12 for a duration functionally representative of the time difference between the arrivals at the anticoincidence circuit 40 of the pulses from the period counter 20 and the comparator 24. During the time the error counter 12 is gated open by the anticoincidence circuit 40, pulses in the amine signal 16B, from the converter 7, will be admitted and counted or accumulated as an indication of "apparent error."

It should be noted that if the pulse from the comparator circuit 24 arrives ahead of the pulse from the period counter 20, the ratio counter 22 has accumulated the predetermined number of pulses too soon and thus the pumping rate of the amine is excessive. Alternately, if the pulse from the comparator circuit 24 arrives late, the ratio counter 22 has accumulated the predetermined number of pulses too late and thus the pumping rate for amine should be increased.

It should also be noted, however, that the count accumulated by the error counter 12 is a pure number and does not represent whether the error involves excess or deficiency in pumping rate. Accordingly, the anticoincidence circuit 40 is preferably adapted to generate a supplementary "direction" signal, if the error is one of deficiency in pumping rate, and this signal is applied to the bidirectional stepper motor 6 to turn the 10-turn potentiometer 5 in a direction so as to increase the speed of the DC motor 3. On the other hand, if the pulse from the comparator circuit 24 arrives early, there is preferably no directional signal applied from the anticoincidence circuit 40 to the stepper motor 6, and the stepper motor 6 will automatically turn the 10-turn potentiometer 5 so as to reduce the speed of the DC motor 3.

As hereinbefore explained, a clock 9 is provided to deliver a timing pulse having a preselected duration such as a tenth of a second, and this timing pulse is applied to a control circuit 28. The control circuit 28 responds by first generating a gating signal to the AND gate 26 to pass resin transfer rate pulses to a counter 32 for the interval or duration of the timing pulse from the clock 9. Upon termination of the timing pulse, the control circuit 28 discontinues the gating pulse to the AND gate 26 and applies a command signal to the holding register 34 to transfer the pulse count accumulated by the counter 32 during the timing pulse from the clock 9.

It will be noted that a stepper oscillator 30 is preferably included to continuously generate pulses at a preselected constant frequency, and that these oscillator pulses are simultaneously applied to a divider circuit 36 and to the counter 32. After the error pulses representing the "apparent error" have been accumulated in the error counter 12, the anticoincidence circuit 40 transmits a command signal to the control circuit 28, and a complement of the count in the holding register 34 is caused to be transferred to the counter 32. Simultaneously, the control circuit 28 enables the divider circuit 36 to commence transmitting oscillator pulses to the bidirectional stepper motor 6 at a frequency which is a preselected dividend of the frequency of the incoming oscillator pulses. Simultaneously, the same oscillator pulses applied to the divider circuit 36 begin running into the counter 32. As hereinbefore stated, the counter 32 contains the complement of the pulse count held in the holding register 34, and thus each oscillator pulse entering the counter 32 functions to increase the pulse total held therein by one until the counter 32 reaches capacity.

When the counter 32 reaches capacity, it generates a pulse to the error counter 12 to reduce by one the total error pulse count contained therein. Simultaneously, the counter 12 is caused to generate a command signal to the control circuit 28, and the control circuit 28 again transfers the complement of the pulse count originally accumulated in the counter 32 and stored in register 34 back into the counter 32. At this point, the oscillator pulses again run into the counter 32 until capacity is reached and the counter 32 again discharges to reduce by one the total error pulse count then remaining in the error counter 12. This sequence continually repeats itself until the error counter 12 is driven to zero, whereupon a command signal from the error counter 12 turns off the control circuit 28 to stop the input of oscillator pulses into the divider 36.

It may be seen that if the error pulses accumulated in the error counter 12 were applied directly to the stepper motor 6, and if (for example) the sample period is one-tenth the time base of the resin input pulses 16A, the stepper motor 6 will be driven only one-tenth the amount required to correct the error between the preset and the actual mass transfer rates. It may be seen that the pulses transmitted from the divider circuit 36 reach the stepper motor 6 at a constant fixed frequency, but only for a time interval which is a function of the time base of the resin pulse frequency 16A and the time required to count out the error pulses in the error counter 12. However, the time required to count down the error counter 12 depends on the number of error pulses, and thus the number of output pulses from the divider 36 will be a product of the number of error pulses and the aforementioned reciprocal of the ratio of the sample time base and the time base of the resin input pulse frequency 16A.

Figure 3:
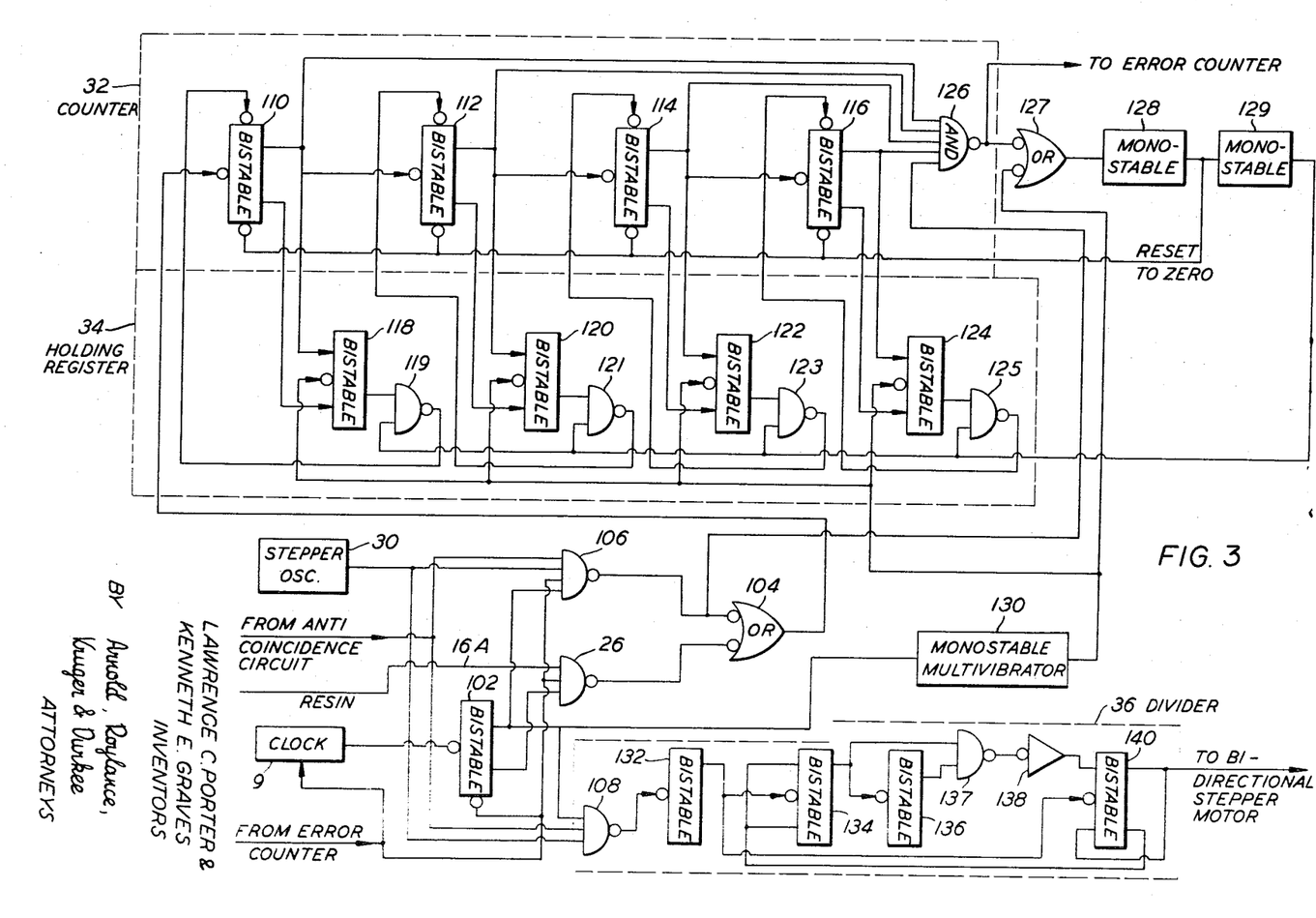
FIG. 3 is a more detailed functional representation of portions of the system represented more generally in FIGS. 1 and 2.

Referring now to FIG. 3, there may be seen a functional representation of a suitable embodiment of portions of the system illustrated in FIG. 2, including those components hereinbefore referred to as the counter 32, the holding register 34, the divider 36, and the control circuit 28. As previously stated, the resin pulses 16A are applied continuously to one input of the AND gate 26. In addition, another enabling signal is applied to the AND gate 26 by the error counter 12 immediately upon the commencement of input of error pulses to the error counter 12. As may further be seen in FIG. 3, a bistable multivibrator 102 is conditioned to normally apply a third enabling signal to the AND gate 26, whereby the resin pulses 16A are applied through an OR gate 104 to a second bistable multivibrator 110 which constitutes the first stage of the counter 32.

As illustrated in FIG. 3, the counter 32 may be composed of four bistable multivibrators 110, 112, 114 and 116, each functioning as a stage. Any number of stages may be provided, however, since the first input pulse to the multivibrator 110 causes it to emit a conditioning voltage to the input of bistable multivibrator 112, and the second input pulse to multivibrator 110 will discontinue this output voltage, thereby causing multivibrator 112 to emit a similar conditioning input voltage to the third bistable multivibrator 114, etc.

The clock 9 is energized upon the commencement of the aforementioned command or control signal from the error counter 12 to the second input of the AND gate 26. After a preselected delay interval which is preferably an integral of the time base of the resin input signal 16A, the clock 9 produces a timing pulse which conditions the multivibrator 102 to discontinue its gating output signal to the third input of the AND gate 26 upon termination of the timing pulse from the clock 9. During the timing pulse, however, counts are being accumulated in the stages of the counter 32 as hereinbefore explained, and thus the magnitude of the accumulated counts may be seen to be a function of the frequency of the resin pulses 16A.

The stepper oscillator 30 is continuously producing a train of oscillator pulses at a fixed frequency, as hereinbefore explained, and these pulses may be seen to be applied to an input of the AND gate 106, and to an input of the AND gate 108 in the divider 36. However, AND gates 106 and 108 must also receive enabling signals from the anticoincidence circuit 40, and this signal occurs only after the total "apparent error" has been accumulated in the error counter 12. Accordingly, the oscillator pulses do not presently pass through AND gates 106 and 108.

As hereinbefore stated, the count accumulated in the counter 32 must be transferred to the holding register 34 at the termination of the timing pulse from the clock 9. In FIG. 3, therefore, the bistable multivibrator 102 discontinues its output pulse upon termination of the timing pulse, thereby closing AND gate 26, and applying an enabling signal to an input of AND gate 106, and to an input of AND gate 108. In addition, the enabling signal triggers the monostable multivibrator 130 causing it to apply a pulse to an input of the OR gate 127, and to a clocking input terminal of bistable multivibrators 118, 120, 122 and 124 in the holding register 34.

It will be apparent that each of the bistable multivibrators 110, 112, 114 and 116, in the counter 32, have two different outputs, and that one of these two outputs will always be producing an output voltage. In other words, when the first input signal to multivibrator 110 causes it to apply a voltage to the input of the second stage multivibrator 112, a voltage will concurrently terminate in the other output of multivibrator 110 leading into the first input of multivibrator 118 in the holding register 34. On the other hand, a voltage will appear in this other output from multivibrator 110 when the second input pulse arrives at the multivibrator 110.

Accordingly, a voltage will exist in one of the two inputs to multivibrator 118 when the clocking signal arrives as previously stated. If multivibrator 110 is producing a voltage at the input of multivibrator 112, at the time the clocking pulse arrives at multivibrator 118, then no output will appear from multivibrator 118. However, if multivibrator 110 is not then producing a voltage into multivibrator 112, then the arrival of the clocking pulse at multivibrator 118 will produce an output voltage into AND gate 119.

The clocking pulse or voltage from monostable multivibrator 130 is applied to one input of the OR gate 127 to apply a corresponding signal to the input of monostable multivibrator 128. Upon the termination of this clocking signal and the output from the OR gate 127, the monostable multivibrator 128 produces a pulse at the input of monostable multivibrator 129, and to the reset inputs of multivibrators 110, 112, 114 and 116, thereby returning each stage of the counter 32 to "zero." Upon termination of the pulse from the monostable multivibrator 128, the monostable multivibrator 129 will fire to produce a command pulse at one of the two inputs of each of the AND gates 119, 121, 123 and 125, thereby causing these units to pass signals, if input signals are also then present at their other input terminals.

More particularly, if AND gate 119 is then receiving a signal from multivibrator 118, it will apply a signal to the "set" input of multivibrator 110. Similarly, if AND gate 121 is then receiving a signal from multivibrator 120, it will apply a signal to the "set" input of multivibrator 112. Thus, the complement of the count then held in the holding register 34 is transferred into the counter 32, as hereinbefore explained.

It will be seen that AND gates 106 and 108 are now receiving all respective input or command signals except the aforementioned enabling signal from the anticoincidence circuit 40. As hereinbefore explained with respect to FIG. 2, this signal is generated when the activating input signal, from the anticoincidence circuit 40 into error counter 12, is terminated.

When the AND gates 106 and 108 receive this signal from the anticoincidence circuit 40, the AND gate 108 is opened to pass oscillator pulses from the stepper oscillator 30 into the divider circuit 36, and the AND gate 106 is opened to pass these same oscillator pulses through the OR gate 104 to the input of the multivibrator 110 in the first stage of the counter 32.

The oscillator pulses from AND gate 106 will also be seen to be applied to one of the inputs of the AND gate 126, which functions as the exit terminal of the counter 32. The AND gate 126 is still closed, however, as will hereinafter be explained.

As may be seen in FIG. 3, the divider circuit 36 is composed of a tandem array of four bistable multivibrators 132, 134, 136 and 140, to divide the incoming oscillator pulses by a factor of 10. Accordingly, a pulse arriving at the input of multivibrator 132 will cause it to produce an output voltage into multivibrator 134. When the next pulse arrives at multivibrator 132, this output terminates and multivibrator 134 then produces an input voltage to multivibrator 136 and into one of the inputs of AND gate 137. When next pulse enters multivibrator 132, it again applies an input to multivibrator 134, but multivibrator 134 continues to produce an output voltage into multivibrator 136 and into AND gate 137.

When the fourth pulse enters multivibrator 132, the output therefrom will again terminate, and multivibrator 134 will also terminate its output into multivibrator 136 and AND gate 137. However, multivibrator 136 will now produce an output into the other input terminal of AND gate 137.

When the fifth oscillator pulse strikes the input of multivibrator 132, this unit resumes the input voltage to multivibrator 134. When the sixth oscillator pulse enters multivibrator 132, this discontinues the input voltage into multivibrator 134, and resumes the input voltage to multivibrator 136 and to AND gate 137. Since multivibrator 136 continues to produce an output into the other input of AND gate 137, a voltage will now pass through the inverter 138 to one input side of multivibrator 140.

When the seventh oscillator pulse enters multivibrator 132, this resumes the voltage into multivibrator 134 which continues to generate an input into multivibrator 136 and AND gate 137. However, the voltage output from multivibrator 132 also acts as a conditioning signal into multivibrator 140. When the eighth oscillator pulse enters multivibrator 132, the output voltage into multivibrator 134 will terminate, thus terminating its output voltage into multivibrator 136 and AND gate 137. Since one of the two enabling signals has now disappeared from the AND gate 137, its output now ceases and multivibrator 140 now produces an output voltage to the bidirectional stepper motor 6 and to its other input terminal. The voltage previously existing in the other output terminal of the multivibrator 140 now terminates, thereby preventing multivibrator 134 from responding to multivibrator 132. Hence, the ninth input pulse into multivibrator 132 will produce an output voltage to multivibrator 134 and to multivibrator 140. Multivibrator 134 is nonresponsive, as hereinbefore stated, but multivibrator 140 is conditioned by this output voltage from multivibrator 132.

When the tenth oscillator pulse enters multivibrator 132, its output voltage into multivibrators 134 and 140 ceases. Multivibrator 134 cannot change condition because of the absence of a signal from the gating terminal of multivibrator 140. However, multivibrator 140 now responds by discontinuing the output signal to the stepper motor 6, and by resuming the gating voltage in its other output leading into multivibrator 134, whereby the cycle may be repeated by the arrival of oscillator pulses 11 through 20 into multivibrator 132.

Pulses from the stepper oscillator 30 are being accumulated in the counter 32 while also entering the divider 36, as hereinbefore explained. The counter 32 will accumulate these pulses until each of the multivibrators 110, 112, 114 and 116, are conditioned to produce an output voltage into one of the inputs of AND gate 126, whereupon the AND gate 126 applies one of the oscillator pulses (from AND gate 106) to the error counter 12, and through the OR gate 127 to the input side of the monostable multivibrator 128.

The output from the multivibrator 128 will reset the stages in the counter 32 to "zero," and will trigger the monostable multivibrator 129 thereby again transferring the complement of the counts in the holding register 34 into the counter 32 as hereinbefore explained. This sequence is then repeated until error counter 12 is returned to zero as also previously explained.

It will be apparent that one output pulse will be produced from the counter 32 for every nine pulses transferred into the counter 32 (provided the holding register 34 contained nine counts) whereas the divider circuit 36 produces one count for every 10 pulses received. This provides the multiplying factor, however, whereby the count in the error counter 12 is multiplied to provide "true error" as hereinbefore explained.

Figure 4:
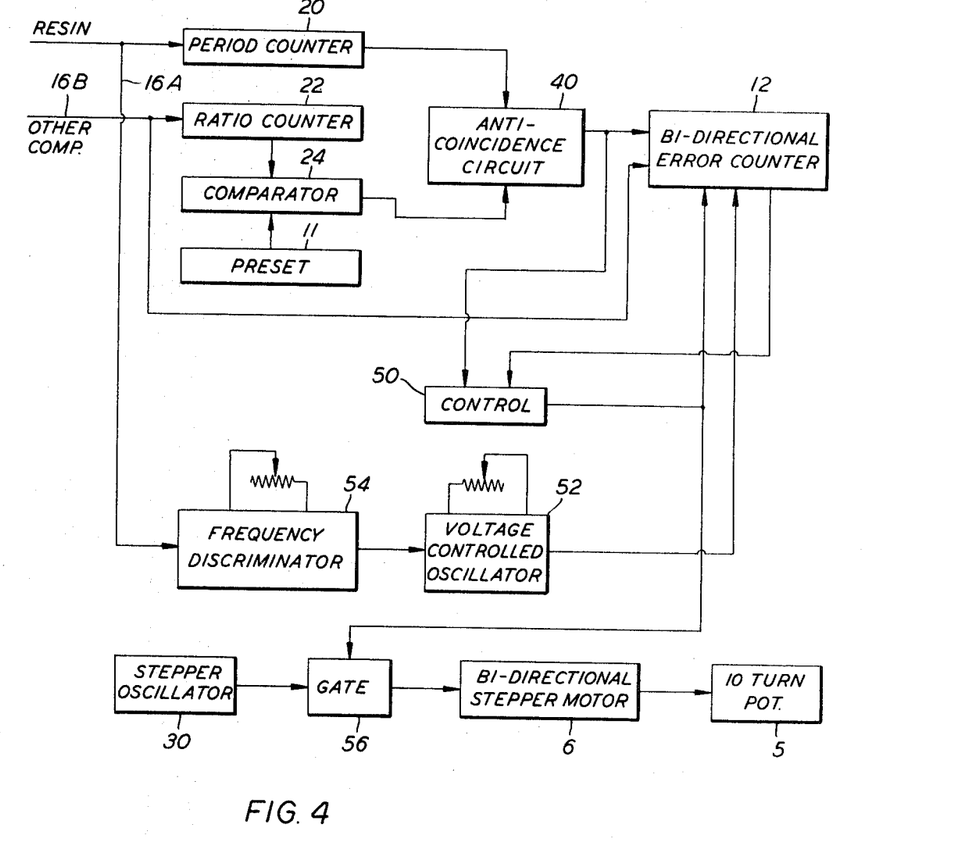
FIG. 4 is a detailed functional representation of an alternate embodiment of the form of the present invention as illustrated generally in FIG. 3.

Referring now to FIG. 4, there may be seen an alternate embodiment of the invention illustrated in FIGS. 2—3, including the period counter 20, ratio counter 22, comparator 24, preset circuit 11, anticoincidence circuit 40, and bidirectional error counter 12, but wherein the other multiplier components in FIG. 2 have been replaced by an adjustable frequency discriminator 54, an adjustable voltage-controlled oscillator 52, and a suitable control circuit 50. In this embodiment, the period counter 20 is similarly adjusted to accumulate a preselected number of resin transfer rate pulses 16A, and thereafter to generate a signal to the anticoincidence circuit 40 as hereinbefore described. In the meantime, the amine rate pulses 16B are applied to the ratio counter 22 and to the error counter 12.

When the ratio counter 22 accumulates a sufficient number of amine rate pulses 16B to correspond to the value established in the preset 11, the comparator 24 produces an output which is applied to the anticoincidence circuit 40 which produces an output to stop the error counter 12 from further accumulation of amine rate pulses 16B and to actuate the control circuit 50. Upon receipt of this output from the anticoincidence circuit 40, the control circuit 50 generates a command signal to error counter 12 and to a gate 56 between the stepper oscillator 30 and the bidirectional stepper motor 6.

The gate 56 will now open to pass pulses from the stepper oscillator 30 into the stepper motor 6, to adjust the 10-turn potentiometer 5 as hereinbefore explained. Simultaneously, the error counter 12 is conditioned by the command signal from the control circuit 50 to be counted or driven back to "zero."

However, it will be noted that an adjustable frequency discriminator 54 is provided to receive resin rate pulses 16A, and in response thereto to provide an output signal, which may be either a voltage or a current, but which is directly proportional (over reasonable limits) to the frequency of the resin rate pulses 16A. This signal, in turn, activates a suitably adjustable voltage (or current) controlled oscillator 52 which produces a pulse train functionally related in frequency which runs into the conditioned error counter 12 until it is driven back to "zero." Thereafter the error counter 12 produces a "stop" signal which is applied to the control circuit 50 to terminate its command or enabling signal to the gate 56 and the error counter 12.

As stated earlier, the multiplying factor is theoretically the ratio of the time base of the actual measurement frequency to the time base of the sample period. However, the measurement frequency is clearly a direct function of its own time base, and the preselected number of resin pulses is also a similar or corresponding function of the sample time period, as may be seen in the foregoing discussion of FIGS. 2 and 3. Accordingly, in the structures discussed and depicted herein, the multiplying factor used to derive "true error" is the ratio of the resin frequency to the preselected number of resin pulses defining or establishing the sample period during which "apparent error" is determined.

Although the use of the present invention for deriving a correction signal for a material blending system has been emphasized herein, it should be appreciated that the invention is broadly methods and apparatus for deriving an output which is a multiple or function of a multiple of an input frequency. More particularly, methods and apparatus are provided for multiplying a digital number, preferably expressed in pulses, by an input frequency of any character.

Many modifications and variations besides those specifically mentioned may be made in the techniques and structures described herein and depicted in the accompanying drawings without departing substantially from the concept of the present invention. Accordingly, it should be clearly understood that the forms of the invention described and illustrated herein are exemplary only, and are not intended as limitations on the scope of the present invention.

What we claim is:

1. Apparatus for multiplying a determined number of pulses by a function of a frequency, comprising
    timing means for defining a discrete time interval,
    sampling means responsive to an input frequency and
        to said timing means for establishing the number of units of said input frequency occurring during said time interval, and
    multiplying means coupled to said sampling means for interrelating said determined number of pulses and said established number of units occurring during said time interval for deriving a product functionally related to said established number of said units, said determined number of pulses, and said time interval.

2. The apparatus described in claim 1, wherein said sampling means comprises
    counting means responsive to said timing means for counting said units of said input frequency.

3. The apparatus described in claim 2, wherein said counting means is adapted to provide an output functionally related to said time interval and said units of said input frequency.

4. Apparatus for multiplying a determined number of pulses by a function of a frequency, comprising
    timing means for defining a discrete time interval,
    sampling means comprising a counter means responsive to first and second input frequencies and said timing means for counting the number of pulses in said first frequency occurring during said discrete time interval and for generating in response thereto a counter output frequency functionally related to the ratio of said counted first frequency pulses to said second input frequency, and
    multiplying means for deriving the product functionally related to said second input frequency and said determined number of pulses.

5. The apparatus described in claim 4, wherein said multiplying means includes
    divider means for deriving a function of the ratio of said determined number of pulses to said counter output frequency.

6. The apparatus described in claim 5, wherein said multiplying means further includes
    selection means for selecting pulses functionally related to said second input frequency pulses and corresponding in number to a function of the product of said second input frequency and said function of the ratio of said determined number of pulses to said counter output frequency.

7. The apparatus described in claim 6, wherein said counter is adapted to receive said second input frequency upon the expiration of said time interval and in response thereto to derive said counter output frequency.

8. The apparatus described in claim 6, wherein said apparatus further comprises
    a frequency generator for generating said second input frequency.

9. The apparatus described in claim 8, wherein said apparatus further comprises
    a second divider means for generating product pulses at a frequency which is a preselected dividend of said second input frequency, and
    wherein said selection means is arranged to select product pulses corresponding in number to a preselected dividend of said function of the product of said second input frequency and said function of said determined number of pulses.

10. Apparatus for deriving the product of a selected number of indicating pulses and a function of a frequency, comprising
    timing means for defining a discrete time interval,
    first signal means responsive to a train of first input pulses for deriving a first signal functionally representative of the number of said first input pulses occurring during said time interval, second signal means for deriving a second signal functionally related to the ratio of the frequency of a train of second input pulses to said number of first input pulses occurring during said time interval, third signal means for deriving a third signal functionally related to the ratio of said selected number of indicating pulses to said ratio of the frequency of said second input pulses to said number of said first input pulses occurring during said time interval, and selection means for selecting a number of said second input pulses corresponding to a function of the product of said third signal and the frequency of said second input pulses.

11. A method of multiplying a determined number of pulses by a function of a frequency, comprising electrically defining a discrete time interval, electrically sampling an input frequency during said discrete time interval, electrically counting the number of pulses occurring in said sampled input frequency during said time interval, and generating an electrical output which is a function of the product of said counted number of said sampled input frequency pulses, said determined number of pulses and said time interval.

12. The method described in claim 11, and further including generating a reference input frequency, electrically counting the number of pulses occurring in said sampled input frequency during said time interval, and generating an electrical output which is a function of the ratio of said counted sampled input frequency pulses to said reference input frequency.

13. The method described in claim 12, including generating an electrical function of the ratio of said determined number of pulses to said function of the ratio of said counted sampled input frequency pulses to said reference input frequency.

14. The method described in claim 13, including generating electrical pulses functionally related to pulses in said reference input frequency functionally related in number to a function of the product of said reference input frequency and said function of the ratio of said determined number of pulses to said ratio of said counted sampled frequency pulses to said reference input frequency.

15. The method described in claim 14, wherein said reference input frequency is received upon the expiration of said time interval.

16. The method described in claim 15, including generating a third frequency functionally related to a preselected dividend of said reference input frequency, and generating pulses from said third frequency and corresponding in number to a function of the product of said reference input frequency and said function of the ratio of said determined number of said counted sampled frequency pulses to said reference input frequency.

17. Method of deriving the product of a selected number of indicating pulses and a function of a frequency, comprising, for a given number of said selected indicating pulses, electrically sampling a first input frequency, during a given time interval, generating a first pulse output functionally representative of the number of said first input frequency pulses occurring during said time interval, generating a second input frequency, generating a second pulse output functionally related to the ratio of said second input frequency to said first pulse output, generating a third pulse output functionally related to the ratio of said given number of selected indicating pulses to said second pulse output, and generating a number of product pulses corresponding in number to a function of the product of said third pulse output and said second input frequency.

18. The method described in claim 17, wherein said second pulse output is derived upon the expiration of said time interval.

19. The method described in claim 18, including generating a train of divider pulses having a frequency functionally related to a preselected dividend of said second input frequency, and generating said product pulses from said divider pulses in number corresponding functionally to the product of said third pulse output and said second input frequency.

20. Apparatus for deriving a correction signal, comprising a period counter for generating a period pulse representing the time interval during which a preselected number of master frequency pulses occur, a ratio counter for counting pulses in an incoming measurement frequency, a comparator for generating a comparison pulse when said ratio counter receives and counts a preselected number of measurement pulses, anticoincidence means for generating first and second anticoincidence pulses defining the time differential between said period and comparison pulses, bidirectional error counter for counting measurement pulses in response to said first anticoincidence pulse and for terminating such count in response to said second anticoincidence pulse, a stepper oscillator generating a fixed frequency of oscillator pulses, a clock for generating a sample period pulse, a multiplier counter, an AND gate interconnected between said clock and said multiplier counter for admitting master frequency pulses to said multiplier counter during said sample period pulse, holding register for holding the sum of said master frequency pulses counted by said multiplier counter during said sample period pulse, control means for connecting oscillator pulses to said multiplier counter upon the termination of said sample period pulse to cause said multiplier counter to produce a dividend signal functionally related to the dividend of the frequency of said oscillator pulses by said sum of said master frequency pulses in said holding register, and a divider responsive to said stepper oscillator for producing a divider frequency functionally related to the dividend of said oscillator frequency by a preselected divisor.

21. Apparatus for multiplying a determined number of pulses by a function of a frequency, comprising sampling means responsive to an input frequency for establishing units of said input frequency, means for operating said sampling means for a discrete time interval for obtaining a base number of units occurring during said time interval, and means coupled to said sampling means for interrelating said determined number of pulses and said base number of units, and for deriving the product of said determined number of pulses and a multiple of said base number of units, said multiple being a function of said time interval.

22. In apparatus in which a number of first pulses is compared to a predetermined number of second pulses and has a specific relationship, multiplying means for producing output pulses as a multiple of the deviation in number of first pulses to the specific relationship comprising:

means for receiving deviation pulses representative of the deviation of a number of first pulses from a predetermined number of first pulses relative to a predetermined number of second pulses over a defined time period, means for defining the pulse count of said predetermined number of second pulses, and means for producing output pulses for each deviation pulse by generating and counting pulses and, for each summation equal to said pulse count, producing said output pulses at a multiple determined as a function of the number of summations of said pulse count.

23. The apparatus of claim 22 wherein said output pulse producing means further includes
a pulse generator, and
means responsive to the output of said pulse generator for counting the pulse generator pulses for each deviation pulse at a submultiple of said output pulses.

24. In apparatus in which a number of first pulses is compared to a predetermined number of second pulses and has a specific relationship, multiplying means for producing output pulses as a multiple of the deviation in number of first pulses to the specific relationship comprising:
means for receiving deviation pulses representative of the deviation of a number of first pulses from a predetermined number of first pulses relative to a predetermined number of second pulses over a defined time period,
means for producing counting pulses,
means for effectively dividing said counting pulses by a factor of 10, and, for each deviation pulse, counting the number of counting pulses relative to a number of second pulses occurring during said defined time period, and
means for effectively dividing said counting pulses by a factor of 1,000 to provide output pulses at a multiple of 10 relative to said deviation pulses.

25. Apparatus for multiplying a determined number of pulses by a multiplying factor where said determined number of pulses represents a measurement relative to a ratio of a number of first pulses to a number of second pulses comprising:
means for receiving a predetermined number of second pulses over a discrete time interval and for establishing the number of said second pulses occurring during said discrete time interval,
means for generating counting pulses,
counter means for receiving said counting pulses at a time other than during said discrete time interval and for providing an output control pulse for each determined pulse for each time the number of counting pulses equals the established number of said second pulses, and
means responsive to said counting pulses for producing a pulse output as a multiple of the number of output control pulses.

26. A method for multiplying a time sampled error ratio of one pulse train to a second pulse train in a machine implemented process comprising the steps of
generating electrical pulses representative of the time base of said second pulse train for a predetermined time interval, where said predetermined time interval is functionally related to the time of sampling the error ratio, and
generating electrical output pulses for each error ratio at a multiple established by the relationship of said time base of said second pulse train to said time of sampling the error ratio.

27. A method for multiplying a time sampled error ratio of one pulse train to a second pulse train where error pulses are generated representative of the deviation in the number of pulses of said one pulse train from a predetermined number of pulses of said first pulse train relative to a predetermined number of pulses of said second pulse train during a sampling time period, comprising the steps of generating clock pulses,
electrically dividing the clock pulses by a factor of 10 and counting the number of clock pulses equal to the number of said second pulses occurring during said sampling time period for each error pulse, and
electrically dividing the clock pulses by a factor of one thousand to provide output pulses at a multiple of 10 relative to said error pulses.

28. A method for multiplying a determined number of pulses by a multiplying factor where said determined number of pulses represents a time measurement sample relative to a ratio of a number of first pulses to a number of second pulses during a discrete time interval, comprising
electrically counting the number of second pulses occurring during said discrete time interval, and
generating clock pulses and counting said clock pulses to the number of second pulses occurring during said discrete time interval for each determined pulse and, for each counting to the number of second pulses, generating output pulses as a multiple of each determined pulse.

29. A method of multiplying a determined number of electrical pulses by a function of an electrical frequency, comprising
electrically defining a discrete time interval,
receiving and counting the number of functional increments of an electrical input frequency occurring during said discrete time interval, and
electrically deriving in digital increments a function of the product of said counted number of increments of said input frequency and said determined number of electrical pulses.

30. A method of multiplying pulse train measurements where one pulse train establishes a reference, and the relationship of another pulse train to said one pulse train for a predetermined number of pulses for said one pulse train provides error pulses upon deviation from a preestablished norm, comprising
electrically establishing the number of pulses of said one pulse train occurring during a sampling time period; and
electrically multiplying said error pulses by a time factor functionally related to said sampling time period and by a function of said predetermined number of pulses of said one pulse train.

31. In apparatus for multiplying in a system having a plurality of pulse trains each representative of a parameter where one pulse train establishes a reference and wherein, during a sampling time period, the number of pulses of a second pulse train in deviation from a norm relative to said one pulse train can be established, the improvement comprising:
means for establishing the relationship of the number of pulses of said one pulse train occurring during a sampling time period to a predetermined number of pulses of said one pulse train and means for multiplying said deviation pulses by a time factor functionally related to said sampling time period.